United States Patent
Hull et al.

(10) Patent No.: US 11,078,406 B2
(45) Date of Patent: Aug. 3, 2021

(54) ALTERING WETTABILITY IN SUBTERRANEAN FORMATIONS

(71) Applicant: Saudi Arabian Oil Company, Dhahran (SA)

(72) Inventors: Katherine Leigh Hull, Houston, TX (US); Mohammed Sayed, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/395,059

(22) Filed: Apr. 25, 2019

(65) Prior Publication Data

US 2020/0339867 A1    Oct. 29, 2020

(51) Int. Cl.
| | | |
|---|---|---|
| *E21B 43/25* | (2006.01) | |
| *C09K 8/60* | (2006.01) | |
| *C09K 8/70* | (2006.01) | |
| *C09K 8/80* | (2006.01) | |

(52) U.S. Cl.
CPC .............. *C09K 8/601* (2013.01); *C09K 8/70* (2013.01); *C09K 8/80* (2013.01); *E21B 43/25* (2013.01)

(58) Field of Classification Search
None
See application file for complete search history.

(56) References Cited

U.S. PATENT DOCUMENTS

| | | | |
|---|---|---|---|
| 3,858,655 A * | 1/1975 | Engle | C09K 8/60 166/305.1 |
| 6,579,572 B2 | 6/2003 | Espin et al. | |
| 7,921,911 B2 | 4/2011 | Fuller et al. | |
| 8,763,703 B2 | 7/2014 | Saini et al. | |
| 9,033,043 B2 | 5/2015 | Hinkel | |
| 9,863,211 B2 | 1/2018 | Gamage et al. | |
| 2008/0115930 A1* | 5/2008 | Peters | E21B 43/16 166/248 |
| 2012/0152547 A1* | 6/2012 | Hinkel | E21B 49/081 166/305.1 |
| 2017/0066959 A1* | 3/2017 | Hull | C09K 8/805 |

FOREIGN PATENT DOCUMENTS

| | | |
|---|---|---|
| CA | 2635868 | 12/2008 |
| WO | 2012087898 | 6/2012 |

(Continued)

OTHER PUBLICATIONS

Ehlig-Economides and Economides, "Water as Poppant," SPE-147603, presented at the SPE Annual Technical Conference and Exhibition, Oct. 30-Nov. 2, 2011, 8 pages.

(Continued)

*Primary Examiner* — Andrew Sue-Ako
(74) *Attorney, Agent, or Firm* — Fish & Richardson P.C.

(57) ABSTRACT

A method of altering wettability of a subterranean formation penetrated by a well is described. A first oxidizer including a persulfate is introduced to the subterranean formation. A second oxidizer including a bromate is introduced to the subterranean formation. The well is shut in for a period of time to allow the first oxidizer and the second oxidizer to alter the wettability of the subterranean formation toward non-wetting of oil and of water.

16 Claims, 5 Drawing Sheets

(56) References Cited

FOREIGN PATENT DOCUMENTS

| WO | 2017040824 | 3/2017 |
|----|------------|--------|
| WO | WO 2018045290 | 3/2018 |

OTHER PUBLICATIONS

Ganjdanesh et al. "Treatment of Condensate and Water Blocks in Hydraulic-Fractured Shale-Gas/Condensate Reservoirs," SPE-175145, presented at the SPE Annual Technical Conference and Exhibition, Sep. 28-30, 2015, published in SPE Journal, Apr. 2016, 10 pages.

King, "Thirty Years of Gas Shale Fracturing: What Have We Learned?" SPE-133456, presented at the SPE Annual Technical Conference and Exhibition, Sep. 19-22, 2010, 50 pages.

Sayed and Al-Muntasheri, "A Safer Generation of Wettability Alteration Chemical Treatments," SPE-184566-MS, presented at the SPE International Conference on Oilfield Chemistry, Apr. 3-5, 2017, 25 pages.

PCT International Search Report and Written Opinion issued in International Appl. No. PCT/US2020/029464 dated Jul. 23, 2020, 15 pages.

Kang et al., "An experimental study on oxidizer treatment used to improve the seepage capacity of coal reservoirs," Natural Gas Industry B, vol. 6, Sep. 25, 2018, 9 pages.

\* cited by examiner

ALTERING WETTABILITY IN SUBTERRANEAN FORMATIONS

TECHNICAL FIELD

This document relates to methods for treating subterranean formations for enhancing hydrocarbon fluid recovery.

BACKGROUND

Unconventional hydrocarbon reservoirs are reservoirs with trapped hydrocarbons (for example, oil, natural gas, or combinations of them) in which the hydrocarbon mobility is limited. Extraction of hydrocarbons from such reservoirs typically involves increasing the mobility of the hydrocarbons, for example, by hydraulic fracturing. In hydraulic fracturing, a pressurized fracturing fluid (for example, proppants and one or more chemicals in an aqueous or non-aqueous base fluid) is flowed through the hydrocarbon reservoir. The pressure of the fracturing fluid fractures the reservoir rock to increase mobility of the trapped hydrocarbons.

Wettability is the tendency of a fluid to spread on or adhere to a solid surface in the presence of other immiscible fluids. Wettability is a property to measure the interaction between fluid and solid surface phases. In the context of oil and gas applications, wettability is the tendency of a reservoir rock surface to preferentially contact a particular fluid in a multi-phase fluid system. In terms of hydrocarbon production, the wettability of a subterranean formation can affect the hydrocarbon extraction process. Altering the wettability of the subterranean formation can impact the rate of hydrocarbon extraction from the subterranean formation.

SUMMARY

This disclosure relates to altering the wettability of a subterranean formation including organic matter (such as kerogen) in order to improve hydrocarbon extraction from the subterranean formation.

Certain aspects of the subject matter described can be implemented as a method of altering a wettability of a subterranean formation penetrated by a well. The subterranean formation can be, for example, an unconventional reservoir including organic matter, such as a kerogen-rich shale reservoir. A first oxidizer including a persulfate is introduced to the subterranean formation. A second oxidizer including a bromate is introduced to the subterranean formation. The well is shut in for a period of time to allow the first oxidizer and the second oxidizer to alter the wettability of the subterranean formation toward non-wetting of both oil and water.

This, and other aspects, can include one or more of the following features.

The first oxidizer and the second oxidizer can be mixed before introduction to the subterranean formation.

A spacer fluid can be introduced to the subterranean formation after introducing the first oxidizer and before introducing the second oxidizer.

A spacer fluid can be introduced to the subterranean formation after introducing the second oxidizer and before introducing the first oxidizer.

The first oxidizer can be encapsulated in a polymer shell or an oil phase. The second oxidizer can be encapsulated in a polymer shell or an oil phase.

The first oxidizer and the second oxidizer can be suspended in an emulsion. Introducing the first oxidizer and the second oxidizer to the subterranean formation can include introducing the emulsion to the subterranean formation.

A continuous phase of the emulsion can include diesel, solvent, crude oil, or mineral oil.

The subterranean formation can be fractured.

A proppant can be introduced to the subterranean formation.

The proppant can be introduced to the subterranean formation with at least one of the first oxidizer or the second oxidizer.

A concentration of the proppant can be at most about 10 pounds per gallon.

The well can be shut in for at least about 30 minutes.

The first oxidizer can be an aqueous solution of the first oxidizer, and a concentration of the persulfate in the aqueous solution of the first oxidizer can be at least about 0.04 molar (M).

The second oxidizer can be an aqueous solution of the second oxidizer, and a concentration of bromate in the aqueous solution of the second oxidizer can be at least about 0.01 M.

A chloride salt can be introduced to the subterranean formation.

The chloride salt can be introduced as an aqueous solution of the chloride salt to the subterranean formation with at least one of the first oxidizer or the second oxidizer, and a concentration of the chloride salt can be at least 0.25 M.

It can be determined that the wettability of the subterranean formation has been altered toward non-wetting of oil and of water by performing a contact angle test on a rock sample obtained from the subterranean formation. The contact angle test can include measuring a first contact angle of a first fluid including water on a surface of the rock sample. The contact angle test can include measuring a second contact angle of a second fluid including a hydrocarbon on the surface of the rock sample.

Determining that the wettability of the subterranean formation has been altered toward non-wetting of oil and of water can include determining that the first contact angle and the second contact angle are both in a range from about 70° to about 110°.

The subject matter described in this specification can be implemented in particular implementations, so as to realize one or more of the following advantages, at least some of which are unexpected. First, the compositions described within this disclosure can be used to alter the wettability of surfaces in a subterranean formation (and specifically in subterranean formations including organic matter such as kerogen, for example, kerogen-rich shale reservoirs) to improve gas production from a well installed in the subterranean formation. Second, the compositions described within this disclosure can chemically alter rock surfaces in the subterranean formation, which can permanently modify the wettability of such rock surfaces so that repeated treatments can be avoided. Third, the compositions described within this disclosure can target fractures formed in unconventional formations in contrast to pore spaces of conventional formations. Fourth, the compositions described within this disclosure can be used to alter the wettability of surfaces in a subterranean formation without the use of fluorinated chemicals (such as fluoro-polymers and fluoro-surfactants).

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DETAILED DESCRIPTION

Figure 1:
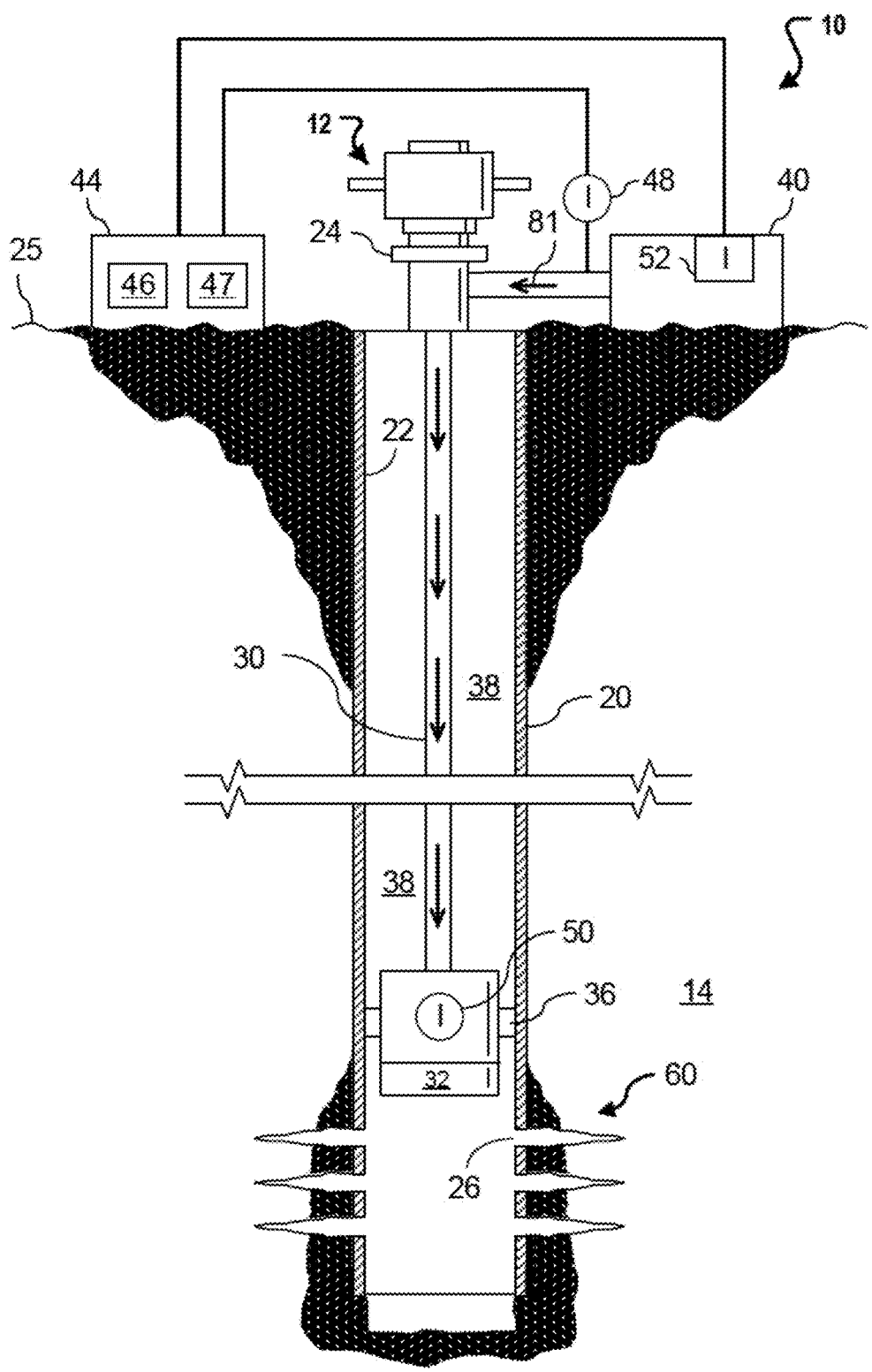
FIG. 1 shows an example of a fracture treatment for a well penetrating a subterranean zone.

Reference will now be made in detail to certain implementations of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Liquid accumulation in a subterranean formation can adversely affect gas production from a well installed in the formation. For example, gas condensate, water, or both can accumulate in fractures of a shale source rock reservoir, thereby inhibiting gas production from the well. Gas condensate can accumulate in fractures near the wellbore and also in the rock matrix that surrounds the fractures. Water (for example, from fracturing water) can accumulate as a result of water vapor condensation, water encroachment from nearby aquifers, or both.

Removing such liquid blockages can improve well productivity. A way to mitigate liquid blockages in the rock formation is to alter the wettability of rock surfaces in the subterranean formation to enhance fluid flow into the well. For example, introducing a treatment fluid that is capable of altering the rock surface such that it is omniphobic (that is, repelling both water and oil) can be beneficial for gas production.

Provided in this disclosure, in part, are methods, compositions, and systems for altering wettability of a rock surface in a subterranean formation. Further, these methods, compositions, and systems allow for increased hydraulic fracturing efficiencies in subterranean formations that include organic matter, such as unconventional rock reservoirs (for example, kerogen-rich shale reservoirs).

The compositions described within this disclosure can be used to alter the wettability of surfaces in a subterranean formation. For example, the compositions can be used in areas or near the areas to be hydraulically fractured in a subterranean formation. Using a composition described within this disclosure, the wettability of an area of the subterranean formation can be altered by, for example, pumping the composition into the subterranean formation. By altering the wettability of the subterranean formation, fluid mobility can increase and liquid blockages can be removed, further improving gas production from the well. In some implementations, the compositions can be used to alter the wettability of a rock surface from oil-wet to neutral-wet. In some implementations, the compositions can be used to alter the wettability of a rock surface from oil-wet to non-oil-wet (for example, water-wet). In some implementations, the compositions can be used to alter the wettability of a rock surface from water-wet to neutral-wet. In some implementations, the compositions can be used to alter the wettability of a rock surface from water-wet to non-water-wet (for example, oil-wet). In some implementations, the compositions can be used to alter the wettability of a rock surface from both oil-wet and water-wet to non-wet to both oil and water.

The composition can include oxidizers including persulfates (such as potassium persulfate or ammonium persulfate), bromates (such as sodium bromate), or a combination of these. The concentration of the components of the composition (for example, the oxidizers) can depend on various factors, such as concentration of pyrite (iron sulfide) in the subterranean formation, concentration of divalent cations (for example, calcium ions and magnesium ions) in the formation water, susceptibility of components in the subterranean formation to oxidation, and susceptibility of other components in the composition to oxidation. For example, the concentration of the oxidizer in the composition can be increased for formations which have more total organic content (TOC) or for those which have larger concentrations of pyrite (iron sulfide). Pyrite is the most readily oxidized component of the rock, and quickly converts to Fe(III) and $SO_4^{2-}$ in the presence of the oxidizers. The TOC is also susceptible to oxidation once the fluid reaches elevated temperature. Finally, any polymer or other organic additive in the fracturing fluid can also be susceptible to oxidation once the fracturing fluid is heated by the formation. The quantities of each of these three things need to be accounted for when determining the concentration of oxidizer needed. The total mass of the oxidizer (and the volume of the fluid) are determined by the size of the treatment (for example, hydraulic fracturing operation) and the expected fracture network. If the oxidizers are included as part of the hydraulic fracturing fluid and process, then large volumes of fluid are required. If the wettability alteration fluid is used after hydraulic fracturing, then smaller volumes will be required.

In some implementations, the composition includes a friction reducer, scale inhibitor, corrosion inhibitor, surfactant, biocide, breaker, flowback aid, or any combination of these.

The composition can further include a fracturing fluid or a pad fluid and can be pumped into a subterranean formation before fracturing, during fracturing, or both. In some implementations, the release of the composition including oxidizers can be delayed from a carrier fluid. Delaying the release of the composition from a carrier fluid can be accomplished by encapsulating the composition. In some implementations, the composition can be encapsulated with coatings through which the composition can be slow-released. Alternatively, or in addition, the coatings can break during fracture closure to release the composition. The composition can be a solid or a powder that can be encapsulated. A delayed release of the composition can decrease corrosion issues (for example, in metal tubing in the wellbore through which the fluids are delivered to the formation) and polymer degradation in the treating fluid. The polymers subject to degradation include, for example, friction reducers used in hydraulic fracturing.

FIG. 1 illustrates an example of a fracture treatment 10 for a well 12. The well 12 can be a reservoir or formation 14, for example, an unconventional reservoir in which recovery operations in addition to conventional recovery operations are practiced to recover trapped hydrocarbons. Examples of unconventional reservoirs include tight-gas sands, gas and oil shales, coalbed methane, heavy oil and tar sands, and gas-hydrate deposits. In some implementations, the formation 14 includes an underground formation of naturally fractured rock containing hydrocarbons (for example, oil, gas, or both). For example, the formation 14 can include a fractured shale. In some implementations, the well 12 can intersect other types of formations 14, including reservoirs that are not naturally fractured.

The well 12 can include a well bore 20, casing 22 and well head 24. The well bore 20 can be a vertical or deviated bore. The casing 22 can be cemented or otherwise suitably secured in the well bore 12. Perforations 26 can be formed in the casing 22 at the level of the formation 14 to allow fluid to flow into the well 12 and be produced to the surface 25.

For the fracture treatment 10, a work string 30 can be disposed in the well bore 20. The work string 30 can be coiled tubing, sectioned pipe or other suitable tubing. A fracturing tool 32 can be coupled to an end of the work string 30. Packers 36 can seal an annulus 38 of the well bore 20 above and below the formation 14.

One or more pump trucks 40 can be coupled to the work string 30 at the surface 25. The pump trucks 40 can pump fluid down the work string 30 to perform various operations, such as fracture the formation 14 (for example, to generate fractures 60 or alter characteristics of the formation 14 (for example, alter wettability). For fracturing, the fluid can include a fluid pad, proppants, a flush fluid, or a combination of these. The pump trucks 40 can include mobile vehicles, equipment such as skids or other suitable structures.

One or more instrument trucks 44 can also be provided at the surface 25. The instrument truck 44 can include a fracture control system 46 and a fracture simulator 47. The fracture control system 46 monitors and controls the fracture treatment 10. The fracture control system 46 can control the pump trucks 40 and fluid valves to stop and start the fracture treatment 10 as well as to stop and start the pad phase, proppant phase, or flush phase of the fracture treatment 10. The fracture control system 46 communicates with surface instruments, subsurface instruments, or both to monitor and control the fracture treatment 10. In some implementations, the surface and subsurface instruments may include surface sensors 48, down-hole sensors 50 and pump controls 52.

A quantity of energy applied by the fracture control system 46 to generate the fractures 60 in the reservoir or formation 14 can be affected not only by the properties of the reservoir rock in the formation but also by the organic matter intertwined within the rock matrix. Moreover, the presence of organic matter in the reservoir can affect production as well.

This specification describes compositions 81 to alter wettability in subterranean formations, such as at the openings of cracks in hydraulic fractures. The compositions can include hydraulic fracturing fluids and flowed through the subterranean formation (for example, a reservoir). As or after the wettability is altered, mobility of fluids (for example, oil, gas, water, or a combination of these) in the subterranean formation (for example a reservoir) can increase, thereby increasing an efficiency (for example, cost, time, and long-term effect) and productivity of the hydrocarbon recovery process.

The compositions described in this disclosure can be used as a treatment material to alter wettability of the formation. Using the compositions described in this disclosure, one or more rock surfaces of the subterranean formation can be etched. To do so, aqueous fluids that contain oxidizers can be pumped into the subterranean formation and react with the one or more rock surfaces of the subterranean formation. For example, the compositions can include strong oxidizers including peroxides such as inorganic peroxides (for example hydrogen peroxide), persulfates such as potassium persulfate or ammonium persulfate, bromates such as sodium bromate, permanganates such as potassium permanganate, or combinations of these.

Figure 2:
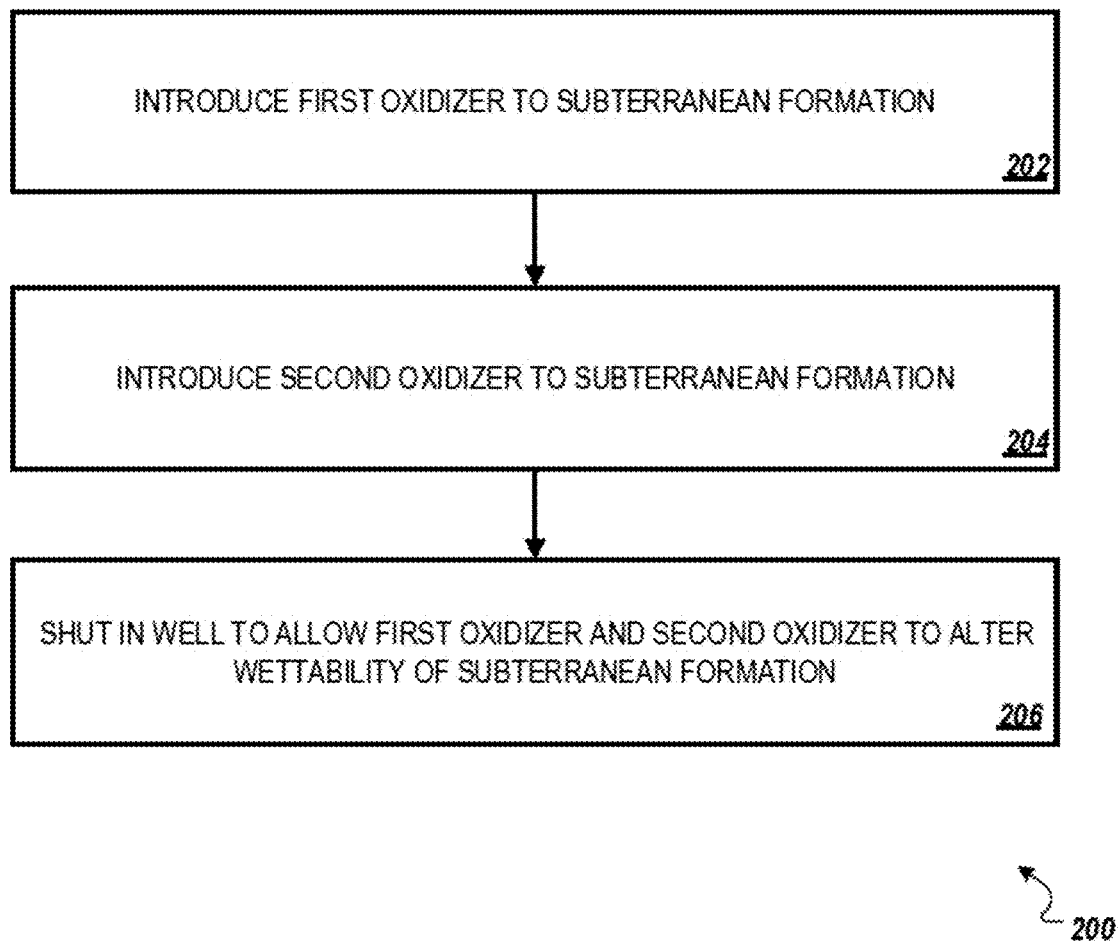
FIG. 2 is a flowchart of an example method of altering wettability of a subterranean zone.

Method of Treating a Subterranean Formation with a Composition Including Two Oxidizers FIG. 2 is a flowchart of an example of a method 200 of altering wettability of a subterranean formation (for example, the formation 14) penetrated by a well (for example, the well 12). At step 202, a first oxidizer is introduced to the subterranean formation. At step 204, a second oxidizer is introduced to the subterranean formation. At step 206, the well is shut in for a period of time (for example, at least 30 minutes) to allow the first oxidizer and the second oxidizer to alter the wettability of the subterranean formation. The first oxidizer and the second oxidizer can cooperate to alter the wettability of the subterranean formation toward non-wetting of oil and water.

The method includes placing in the subterranean formation a composition including a first oxidizer that includes a persulfate and a second oxidizer that includes a bromate. Each of the first oxidizer and the second oxidizer can be placed in the subterranean formation, for example, by pumping into the subterranean formation. Although not intending to be bound by theory, it is believed that there is a synergism between persulfate oxidizers and bromate oxidizers for altering the wettability of rock surfaces. These oxidizers are also capable of treating and breaking down organic content (such as kerogen) embedded in source rocks.

The first oxidizer can include an ammonium persulfate, a potassium persulfate, a sodium persulfate, or a combination thereof. In some implementations, the persulfate includes an ammonium persulfate. For example, the first oxidizer can be an aqueous solution of ammonium persulfate.

The persulfate in the composition can have a concentration of about 0.00005 molar (M) to about 1.00 M. For example, the persulfate can have a concentration of about 0.00005 M, 0.0005 M, 0.005, M 0.05 M, 0.10 M, 0.20 M, 0.30 M, 0.40 M, 0.50 M, 0.75 M, or about 1.00 M. The persulfate can have a concentration of about 0.05 M to about 0.20 M. In some implementations, the persulfate has a concentration of about 0.05 M to about 0.10 M. For example, the persulfate can have a concentration of about 0.05 M, 0.06 M, 0.07 M, 0.08 M, 0.09 M, or about 0.10 M.

The concentration of the persulfate can be calculated based on the amount of the persulfate in the composition to be placed in the subterranean formation. Alternatively, the concentration of the persulfate can be estimated based on the amount of the persulfate in the composition and the amount of fluid downhole at the time of placing the composition into the subterranean formation.

The necessary concentration of the persulfate in the composition can also be determined based on the amount of fluid downhole at the time of placing the composition into the subterranean formation.

The second oxidizer can include a calcium bromate, a magnesium bromate, a potassium bromate, a sodium bromate, or a combination thereof. In some implementations, the bromate includes sodium bromate. For example, the second oxidizer can be an aqueous solution of sodium bromate.

The bromate in the composition can have a concentration of about 0.00005 M to about 2.00 M. For example, the bromate can have a concentration of about 0.00005 M, 0.0005 M, 0.005 M, 0.05 M, 0.10 M, 0.20 M, 0.30 M, 0.40 M, 0.50 M, 0.75 M, 1.0 M, 1.25 M, 1.50 M or about 2.0 M. The bromate can also have a concentration of about 0.05 M to about 0.50 M. For example, the bromate can have a concentration of about 0.05 M, 0.10 M, 0.15 M, 0.20 M, 0.30 M, 0.40 M, or about 0.50 M. In some implementations, the bromate can have a concentration of about 0.05 M to about 0.20 M. For example, the bromate can have a concentration of about 0.10 M to about 0.15 M.

The concentration of the bromate can be calculated based on the amount of the bromate in the composition to be placed in the subterranean formation. Alternatively, the concentration of the persulfate in the composition can be estimated based on the amount of the bromate in the composition and the amount of fluid downhole at the time of placing the composition into the subterranean formation.

The necessary concentration of the bromate in the composition can also be determined based on the on the amount of fluid downhole at the time of placing the composition into the subterranean formation.

In some implementations, the persulfate includes ammonium persulfate and the bromate includes sodium bromate. The ammonium persulfate can have a concentration of about 0.00005 M to about 1.00 M and the sodium bromate can have a concentration of about 0.00005 M to about 2.00 M. For example, the ammonium persulfate can have a concentration of about 0.00005 M to about 1.00 M, about 0.0005 M to about 0.75 M, about 0.005 M to about 0.50 M, about 0.05 M to about 0.40 M, about 0.05 M to about 0.30 M, about 0.05 M to about 0.20 M, or about 0.05 M to about 0.10 M and the sodium bromate can have a concentration of about 0.00005 M to about 1.50 M, about 0.0005 M to about 1.25 M, about 0.005 M to about 1.00 M, about 0.05 M to about 0.75 M, about 0.05 M to about 0.50 M, about 0.05 M to about 0.40 M, about 0.05 M to about 0.30 M, about 0.05 M to about 0.20 M. In some implementations, the ammonium persulfate has a concentration of about 0.05 M to about 0.10 M and the sodium bromate has a concentration of about 0.05 M to about 0.20 M. The concentration of sodium bromate in the composition can be altered based on the concentration of pyrite (iron sulfide) in the subterranean formation. For example, for formations including pyrite, the sodium bromate concentration in the composition can be increased in order to offset the neutralization reaction between sodium bromate and pyrite. The concentration of ammonium persulfate in the composition can be altered based on the concentration of pyrite (iron sulfide) in the subterranean formation and the concentration of divalent cations (such as calcium ions and magnesium ions) in the formation water.

Suitable concentrations of the first oxidizer and second oxidizer in the composition can also be determined by performing at least one of the following: (i) performing laboratory tests on rock surfaces (for example, etching); (ii) estimating the expected size of the fracture network and the resulting surface area of the fractured zones; (iii) determine the weight percent of the total organic carbon (TOC) in the formation (for example, by using a TOC analyzer, pyrolysis unit, well log, or a combination thereof); (iv) determining the weight percent of iron sulfide in the formation (for example, by testing using either x-ray fluorescence, x-ray diffraction, energy dispersive x-ray spectroscopy, well log, or a combination thereof); (v) determining the weight percent of friction reducer, viscosifier, and other organic materials in the treatment fluid; and (vi) determining the concentration of the first oxidizer and second oxidizer by accounting for the iron sulfide present and any organic materials present in the treatment fluid. In some implementations, the ratio of the first oxidizer to the second oxidizer in the composition is about 1:1. In some implementations, the ratio of the first oxidizer to the second oxidizer in the composition is less than 1:1. In some implementations, the ratio of the first oxidizer to the second oxidizer in the composition is greater than 1:1.

The composition can further include a salt. Including a salt in the composition can preserve the strength of rock in a subterranean formation when the rock is contacted with a composition, such as a composition describe in this disclosure. For example, it has been observed that the addition of a salt to a composition of the present disclosure can decrease the reduction of a rock's Young's modulus when the rock is contacted with a composition, such as a composition describe in this disclosure.

In some implementations, the salt includes potassium chloride, sodium chloride, lithium chloride, potassium bromide, sodium bromide, lithium bromide, ammonium chloride, ammonium bromide, ammonium iodide, calcium chloride, magnesium chloride, strontium chloride, calcium bromide, magnesium bromide, strontium bromide, calcium iodide, magnesium iodide, strontium iodide, or a combination thereof. For example, the salt can include potassium chloride. The salt can be present in the composition at a concentration of about 0.001 weight percent (wt %) to about 30 wt % of the composition, about 0.001 wt % to about 25 wt %, about 0.001 wt % to about 20 wt %, about 0.001 wt % to about 15 wt %, or about 0.001 wt % to about 10 wt % of the composition. For example, the salt can be present at a concentration of about 2 wt % to about 7 wt %. The chloride salt can have a concentration of about 0.00005 M to about 2.00 M. For example, the composition can have a chloride salt concentration of at least 0.25 M.

In some implementations, the composition further includes an aqueous liquid. The aqueous liquid can include a brine, a produced water, a flowback water, a brackish water, an Arab-D-brine, a sea water, or a combination thereof. The aqueous liquid can include a drilling fluid, a fracturing fluid, a diverting fluid, a lost circulation treatment fluid, or a combination thereof.

The method can also include obtaining or providing the composition, wherein the obtaining or providing of the composition occurs above-surface. In some implementations, the method includes obtaining or providing the composition, wherein the obtaining or providing of the composition occurs in the subterranean formation. For example, the first oxidizer including a persulfate can initially be placed in the subterranean formation and, at a later time, the second oxidizer including a bromate can be placed in the subterranean formation. Alternatively, the second oxidizer including a bromate can initially be placed in the subterranean formation and, at a later time, the first oxidizer including a persulfate can be placed in the subterranean formation. In some implementations, the first oxidizer and the second oxidizer are mixed before they are introduced to the subterranean formation. In some implementations, introduction of the first oxidizer and introduction of the second oxidizer to the subterranean formation is separated by an introduction of spacer fluid to the subterranean formation. For example, the first oxidizer is introduced to the subterranean formation, then a spacer fluid is introduced to the subterranean formation, and then the second oxidizer is introduced to the subterranean formation. For example, the second oxidizer is introduced to the subterranean formation, then a spacer fluid is introduced to the subterranean formation, and then the first oxidizer is introduced to the subterranean formation.

The method can also further include combining the composition with an aqueous or oil-based fluid including a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form a mixture, wherein the placing the composition in the subterranean formation includes placing the mixture in the subterranean formation. In some implementations, the first oxidizer is encapsulated in a polymer shell or an oil phase. In some implementations, the second oxidizer is encapsulated in a polymer shell or an oil phase. The method can also further include encapsulating the first oxidizer, the second oxidizer, or both in the polymer shell or the oil phase.

In some implementations, the first oxidizer and the second oxidizer are suspended in an emulsion, and the emulsion is introduced to the subterranean formation. In some implementations, a continuous phase of the emulsion includes diesel, crude oil, mineral oil, or combinations of these. The method can also further include suspending the first oxidizer and the second oxidizer in the emulsion.

In some implementations, at least one of prior to, during, and after the placing of the composition in the subterranean formation, the composition is used in the subterranean formation, at least one of alone or in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof.

The composition can also further include a saline, an aqueous base, an oil, an organic solvent, a synthetic fluid oil phase, an aqueous solution, an alcohol or polyol, a cellulose, a starch, an alkalinity control agent, an acidity control agent, a density control agent, a density modifier, an emulsifier, a dispersant, a polymeric stabilizer, a crosslinking agent, a polyacrylamide, a polymer or combination of polymers, an antioxidant, a heat stabilizer, a foam control agent, a diluent, a plasticizer, a filler or inorganic particle, a pigment, a dye, a precipitating agent, a rheology modifier, an oil-wetting agent, a set retarding additive, a surfactant, a corrosion inhibitor, a gas, a weight reducing additive, a heavy-weight additive, a lost circulation material, a filtration control additive, a salt, a fiber, a thixotropic additive, a breaker, a curing accelerator, a curing retarder, a pH modifier, chelating agent, a scale inhibitor, an enzyme, a resin, a water control material, an additional oxidizer, or a combination thereof.

In some implementations the composition can further include a proppant, a resin-coated proppant, or a combination thereof. Such proppants can be introduced with the first oxidizer, the second oxidizer, or both. In some implementations, a concentration of proppant is at most 10 pounds per gallon (ppg) in the composition. In some implementations, a concentration of proppant is at least 0.5 ppg in the composition. In some implementations, a concentration of proppant is in a range from 0.5 ppg to 10 ppg in the composition.

In some implementations, the method further includes processing the composition exiting the annulus with at least one fluid processing unit to generate a cleaned composition and recirculating the cleaned composition into the subterranean formation.

The method can further include fracturing the subterranean formation. In some implementations, the fracturing includes slickwater fracturing. The slickwater fracturing can employ an aqueous fluid to induce a subterranean fracture. The slickwater fluids can include a fresh water or a brine having sufficient friction reducing agents to minimize the tubular friction pressures. Such fluids can have viscosities that are slightly greater than unmodified fresh water or brine.

Also provided in this disclosure is a method of altering wettability of a rock surface in a subterranean formation, that includes placing in the subterranean formation a composition including a first oxidizer including an ammonium persulfate and a second oxidizer including a sodium bromate. The ammonium persulfate has a concentration of about 0.05 M to about 0.10 M and the sodium bromate has a concentration of about 0.05 M to about 0.20 M.

Further provided in this disclosure is a method of fracturing a subterranean formation penetrated by a wellbore. The method includes altering wettability of a rock surface in the subterranean formation with a composition including a first oxidizer including a persulfate and a second oxidizer comprising a bromate. The method further includes fracturing the subterranean formation. In some implementations the persulfate has a concentration of about 0.05 M to about 1.0 M and the bromate has a concentration of about 0.05 M to about 0.20 M.

Also provided in this disclosure is a method of altering wettability of a rock surface in a subterranean formation that includes placing in the subterranean formation a composition that includes a first oxidizer including an ammonium persulfate, a second oxidizer including a sodium bromate, and a salt. In some implementations, the ammonium persulfate has a concentration of about 0.05 M to about 0.10 M, the sodium bromate has a concentration of about 0.05 M to about 0.20 M, and the salt has a concentration of about 0.001 wt % to about 10 wt %.

Further provided in this disclosure is a method of fracturing a subterranean formation penetrated by a wellbore that includes altering wettability of a rock surface in the subterranean formation with a composition including a first oxidizer including an ammonium persulfate, a second oxidizer including a sodium bromate, and a salt. The method further includes fracturing the subterranean formation.

In some implementations, the ammonium persulfate has a concentration of about 0.00005 M to about 0.10 M, the sodium bromate has a concentration of about 0.00005 M to about 0.20 M, and the salt has a concentration of about 0.001 wt % to about 10 wt %.

Compositions Including Two Oxidizers

Further provided in this disclosure is a composition. The composition includes a first oxidizer that includes a persulfate and a second oxidizer that includes a bromate.

The persulfate can include an ammonium persulfate, a potassium persulfate, a sodium persulfate, and combinations thereof. In some implementations, the persulfate includes an ammonium persulfate.

The persulfate can have a concentration of about 0.00005 M to about 1.00 M. For example, the persulfate can have a concentration of about 0.00005 M, 0.0005 M, 0.005, M 0.05 M, 0.10 M, 0.20 M, 0.30 M, 0.40 M, 0.50 M, 0.75 M, or about 1.00 M. The persulfate can have a concentration of about 0.05 M to about 0.20 M. In some implementations, the persulfate has a concentration of about 0.05 M to about 0.10 M. For example, the persulfate can have a concentration of about 0.05 M, 0.06 M, 0.07 M, 0.08 M, 0.09 M, or about 0.10 M.

The bromate can include calcium bromate, magnesium bromate, potassium bromate, sodium bromate, or a combination thereof. In some implementations, the bromate includes sodium bromate.

The bromate can have a concentration of about 0.00005 M to about 2.00 M. For example, the bromate can have a concentration of about 0.00005 M, 0.0005 M, 0.005 M, 0.05 M, 0.10 M, 0.20 M, 0.30 M, 0.40 M, 0.50 M, 0.75 M, 1.0 M, 1.25 M, 1.50 M or about 2.0 M. The bromate can also have a concentration of about 0.05 M to about 0.50 M. For example, the bromate can have a concentration of about 0.05

M, 0.10 M, 0.15 M, 0.20 M, 0.30 M, 0.40 M, or about 0.50 M. In some implementations, the bromate can have a concentration of about 0.05 M to about 0.20 M. For example, the bromate can have a concentration of about 0.10 M to about 0.15 M.

In some implementations, the persulfate includes ammonium persulfate and the bromate includes sodium bromate. The ammonium persulfate can have a concentration of about 0.00005 M to about 1.00 M and the sodium bromate can have a concentration of about 0.00005 M to about 2.00 M. For example, the ammonium persulfate can have a concentration of about 0.00005 M to about 1.00 M, about 0.0005 M to about 0.75 M, about 0.005 M to about 0.50 M, about 0.05 M to about 0.40 M, about 0.05 M to about 0.30 M, about 0.05 M to about 0.20 M, or about 0.05 M to about 0.10 M and the sodium bromate can have a concentration of about 0.00005 M to about 1.50 M, about 0.0005 M to about 1.25 M, about 0.005 M to about 1.00 M, about 0.05 M to about 0.75 M, about 0.05 M to about 0.50 M, about 0.05 M to about 0.40 M, about 0.05 M to about 0.30 M, about 0.05 M to about 0.20 M. In some implementations, the ammonium persulfate has a concentration of about 0.05 M to about 0.10 M and the sodium bromate has a concentration of about 0.05 M to about 0.20 M.

In some implementations, the salt includes potassium chloride, sodium chloride, lithium chloride, potassium bromide, sodium bromide, lithium bromide, ammonium chloride, ammonium bromide, ammonium iodide, calcium chloride, magnesium chloride, strontium chloride, calcium bromide, magnesium bromide, strontium bromide, calcium iodide, magnesium iodide, strontium iodide, or a combination thereof. For example, the salt can include potassium chloride. The salt can be present at a concentration of about 0.001 wt % to about 30 wt % of the composition, about 0.001 wt % to about 25 wt %, about 0.001 wt % to about 20 wt %, about 0.001 wt % to about 15 wt %, or about 0.001 wt % to about 10 wt % of the composition. For example, the salt can be present at a concentration of about 2 wt % to about 7 wt %.

In some implementations, the composition further includes an aqueous liquid. The aqueous liquid can include a brine, a produced water, a flowback water, a brackish water, an Arab-D-brine, a sea water, or a combination thereof. The aqueous liquid can include a drilling fluid, a fracturing fluid, a diverting fluid, a lost circulation treatment fluid, or a combination thereof.

Other Components

The compositions described in this disclosure can further include one or more suitable components. The additional components can be any components, such that the composition can be used as described in this disclosure.

In some implementations, the composition includes one or more viscosifiers. The viscosifier can be any suitable viscosifier. The viscosifier can affect the viscosity of the composition or a solvent that contacts the composition at any suitable time and location. In some implementations, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some implementations, the viscosifier can be about 0.0001 wt % to about 10 wt % of the composition.

In some implementations, the composition, or a mixture including the same, can include any suitable amount of any suitable material used in a downhole fluid. For example, the composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, cement with alumina content, slag cement, silica cement, fly ash, metakaolin, shale, zeolite, a crystalline silica compound, amorphous silica, hydratable clays, microspheres, lime, or a combination thereof.

The composition or mixture can further include a proppant, a resin-coated proppant, an encapsulated resin, or a combination thereof. A proppant is a material that keeps an induced hydraulic fracture at least partially open during or after a fracturing treatment. Proppants can be transported into the subterranean formation and to the fracture using fluid, such as fracturing fluid or another fluid. In some implementations, increasing the viscosity of the fluid being used to transport the proppants into the subterranean formation can improve transport of proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (for example, TEFLON™ available from DuPont), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some implementations, proppant can have an average particle size, in which particle size is the largest dimension of a particle, of about 0.001 millimeters (mm) to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some implementations, the proppant can have a distribution of particle sizes clustering around multiple averages, such as one, two, three, or four different average particle sizes. The composition or mixture can include any suitable concentration of proppant, such as about 0.0001 wt % to about 99.9 wt %, about 0.1 wt % to about 80 wt %, or about 10 wt % to about 60 wt %, or about 0.000,000,01 wt % or less, or about 0.000001 wt %, 0.0001 wt %, 0.001 wt %, 0.01 wt %, 0.1 wt %, 1 wt %, 2 wt %, 3 wt %, 4 wt %, 5 wt %, 10 wt %, 15 wt %, 20 wt %, 30 wt %, 40 wt %, 50 wt %, 60 wt %, 70 wt %, 80 wt %, 85 wt %, 90 wt %, 91 wt %, 92 wt %, 93 wt %, 94 wt %, 95 wt %, 96 wt %, 97 wt %, 98 wt %, 99 wt %, 99.9 wt %, or about 99.99 wt % or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "solvent" as used in this disclosure refers to a liquid that can dissolve a solid, another liquid, or a gas to form a solution. Non-limiting examples of solvents are silicones, organic compounds, water, alcohols, ionic liquids, and supercritical fluids.

The term "room temperature" as used in this disclosure refers to a temperature of about 15° C. to about 28° C.

The term "standard temperature and pressure" as used in this disclosure refers to 20° C. and 101 kPa.

The term "downhole" as used in this disclosure refers to under the surface of the earth, such as a location within or fluidly connected to a wellbore.

EXAMPLES

A shale core was obtained from a gas well. Four samples were cut from the core and mechanically polished on one side.

Sample 1

Sample 1 was then unmounted from the polishing stage and left untreated. Sample 1 was used as a control against which the other samples were compared to determine the effects of the various treatment fluids.

Sample 2

Sample 2 was then unmounted from the polishing stage and added to a treatment fluid containing 1.0 gram (g) of ammonium sulfate, 0.1 g of sodium bromate, and 0.7 g of potassium chloride dissolved in 10 milliliters (mL) of water. The mixture was heated to 100° C. and held at that temperature for 20 hours. The shale sample was then removed from the treatment fluid and dried in an oven.

Sample 3

Sample 3 was then unmounted from the polishing stage and added to a treatment fluid containing 0.02 g of ammonium sulfate and 0.02 g of sodium bromate dissolved in 10 mL of water. The mixture was heated to 100° C. and held at that temperature for 20 hours. The shale sample was then removed from the treatment fluid and dried in an oven.

Sample 4

Sample 4 was then unmounted from the polishing stage and added to a treatment fluid containing 0.02 g of ammonium sulfate, 0.02 g of sodium bromate, and 0.2 g of potassium chloride dissolved in 10 mL of water. The mixture was heated to 100° C. and held at that temperature for 20 hours. The shale sample was then removed from the treatment fluid and dried in an oven.

Experiments Performed on the Samples

Wettability can be quantified by measuring the contact angle between a fluid droplet and a solid surface. If the contact angle is less than 90°, the surface can be considered wetting to that fluid, and the fluid will tend to spread over the surface. If the contact angle is greater than 90°, the surface can be considered non-wetting to that fluid, and the fluid will tend not to spread over the surface (for example, bead up on the surface instead of spread out). If the contact angle is equal to 90°, the surface can be considered neutral-wetting to that fluid. Contact angle measurements were performed on all four shale samples.

A Kruss Drop Shape Analyzer (DSA100) was used to measure the contact angle between a liquid droplet and the polished surface of each of the shale samples. The measurement resolution for this instrument was 0.1°. All contact angle measurements were performed at room temperature and atmospheric pressure.

Figure 3A:
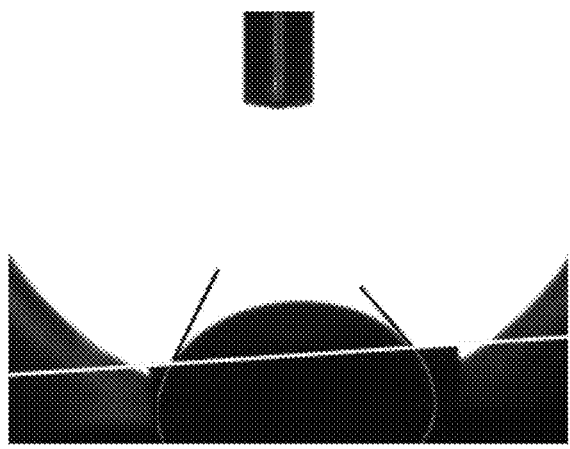
FIGS. 3A, 3B, 3C, and 3D show a water droplet disposed on a rock surface.
Figure 3B:
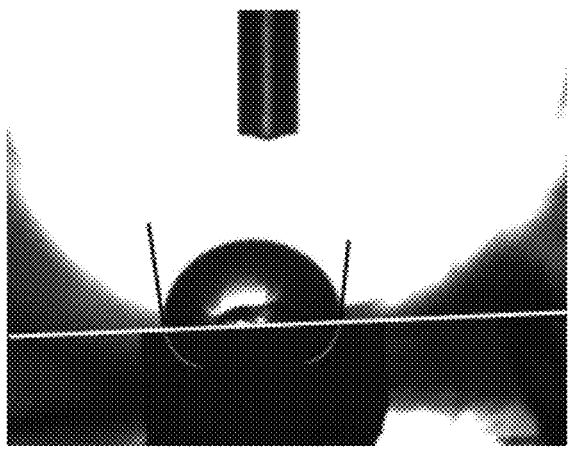
Figure 3C:
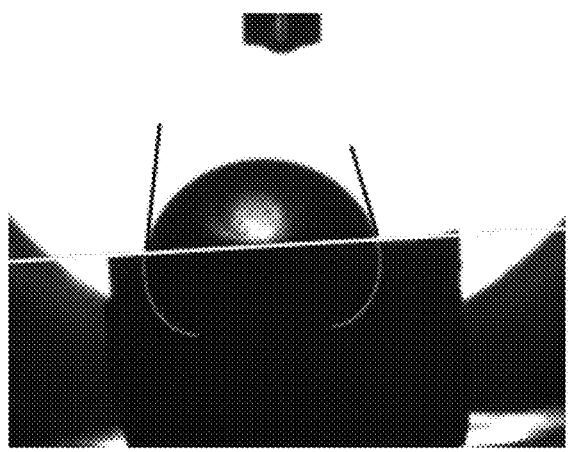
Figure 3D:
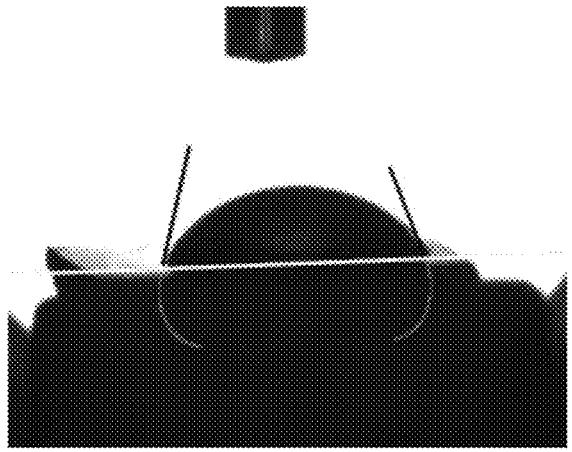

Each of the shale samples were tested for water-wetness. For each of the shale samples (Samples 1, 2, 3, and 4), water was injected from a droplet phase pump, a water droplet was suspended by a needle and disposed on the polished surface, and the contact angle between the water droplet and the polished rock surface was measured. FIG. 3A shows a water droplet on Sample 1 (untreated), and the contact angle was measured as 53.1° (wetting to water). FIG. 3B shows a water droplet on Sample 2, and the contact angle was measured as 99.4° (non-wetting to water). FIG. 3C shows a water droplet on Sample 3, and the contact angle was measured as 77.1° (less water-wetting in comparison to untreated Sample 1). FIG. 3D shows a water droplet on Sample 4, and the contact angle was measured as 69.9° (less water-wetting in comparison to untreated Sample 1). In conclusion, each of the treated samples (Samples 2, 3, and 4) were less water-wetting than the untreated sample (Sample 1). Sample 2 underwent the greatest change in water wettability.

Figure 4A:
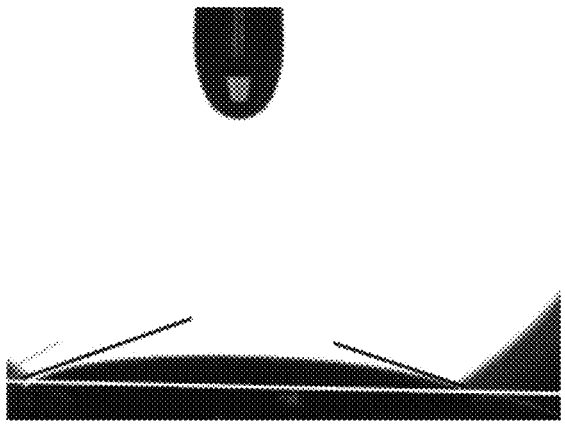
FIGS. 4A, 4B, 4C, and 4D show a hydrocarbon droplet disposed on a rock surface.
Figure 4B:
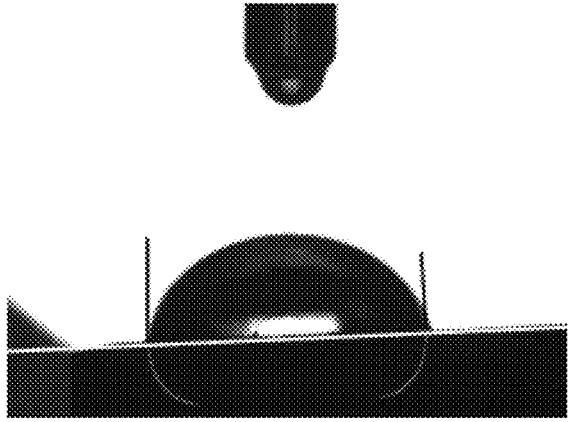
Figure 4C:
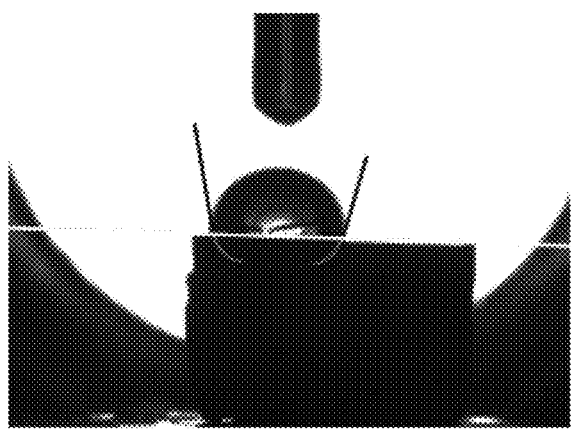
Figure 4D:
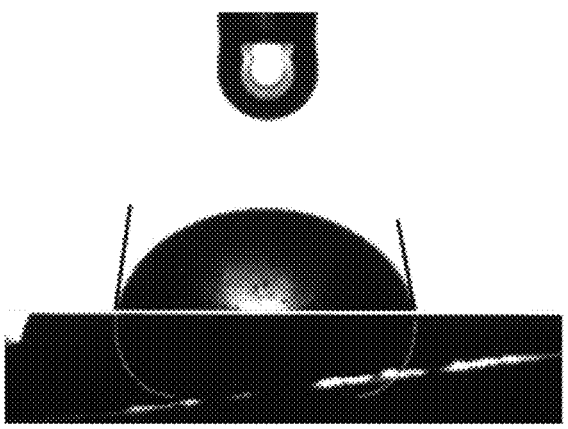

Each of the shale samples were tested for oil-wetness. For each of the shale samples (Samples 1, 2, 3, and 4), decane was injected from a droplet phase pump, an oil droplet (decane) was suspended by a needle and disposed on the polished surface, and the contact angle between the oil droplet and the polished rock surface was measured. FIG. 4A shows an oil droplet on Sample 1 (untreated), and the contact angle was measured as 14.2° (wetting to oil). FIG. 4B shows an oil droplet on Sample 2, and the contact angle was measured as 88.3° (less oil-wetting in comparison to untreated Sample 1). FIG. 4C shows an oil droplet on Sample 3, and the contact angle was measured as 104° (non-wetting to oil). FIG. 4D shows an oil droplet on Sample 4, and the contact angle was measured as 80.9° (less oil-wetting in comparison to untreated Sample 1). In conclusion, each of the treated samples (Samples 2, 3, and 4) were less oil-wetting than the untreated sample (Sample 1). Sample 3 underwent the greatest change in oil wettability.

Therefore, each of the treated samples (Samples 2, 3, and 4) were less water-wetting and less oil-wetting than the untreated sample (Sample 1). In other words, the various treatment fluids altered the wettability of the shale towards omniphobicity. A shift in wettability towards neutrally both oil-wet and water-wet (that is, omniphobicity) is desired. A rock surface can be described as being neutrally oil- and water-wet (omniphobic) when the measured contact angles for both oil and water are in a range from about 70° to about 110°. These results confirm the potential for such treatment fluids including persulfate and bromate to improve the flow of condensate and water in rock formations, thereby allowing gas to flow more freely from the formation and into a production well.

Pyrite Dissolution

Figure 5:
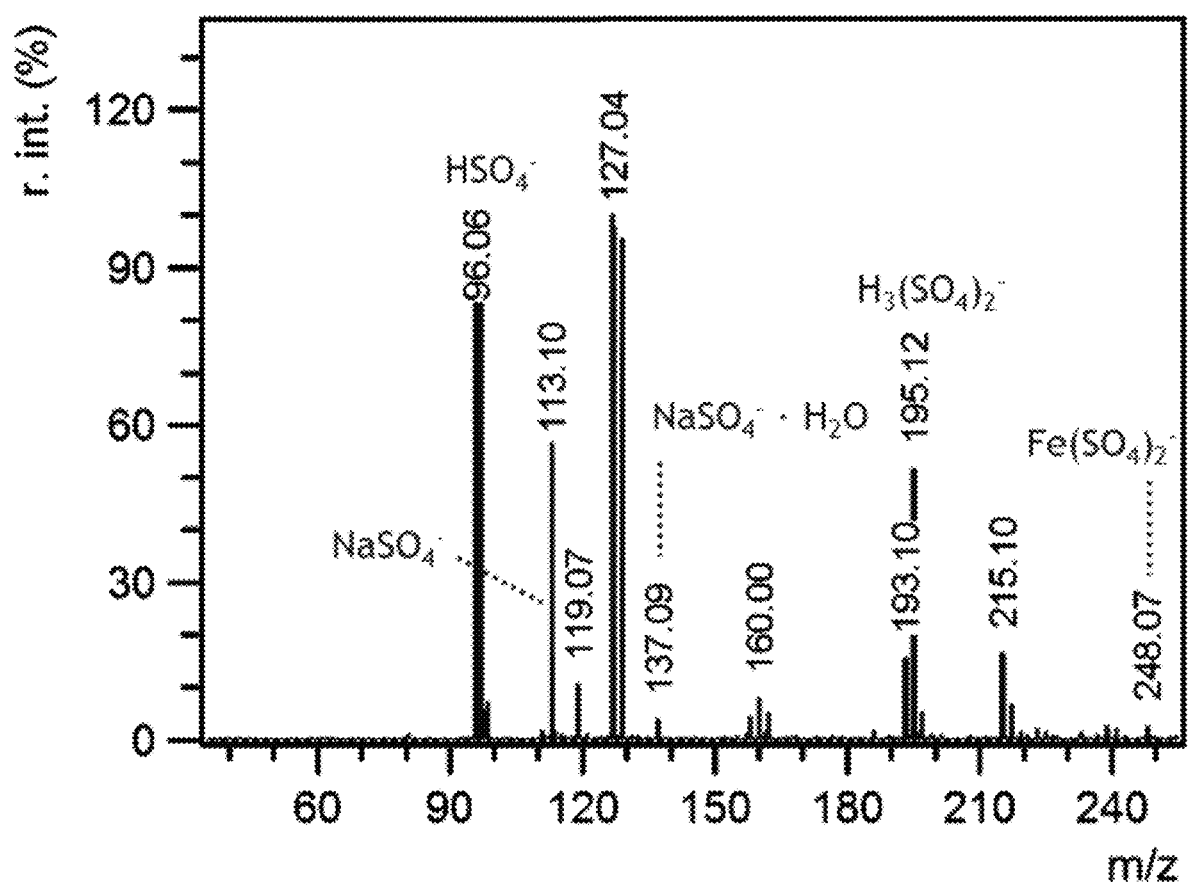
FIG. 5 shows electrospray ionization mass spectrum of an example composition.

The compositions described in this document can dissolve pyrite minerals in source rocks (for example, kerogen-rich shales). Pyrite can be readily converted to iron ($Fe^{3+}$) and sulfate ($SO_4^{2-}$) ions by the oxidizers (persulfate and bromate), and the ions can be dissolved in the aqueous solution. The dissolution of pyrite can cause the wettability of the rock surface to change, for example, by changing the rock surface roughness, by altering rock surface charges, or both. FIG. 5 shows an electrospray ionization mass spectrum (ESI-MS) of a solution after dissolution of pyrite with sodium bromate and ammonium persulfate. The sulfur from the pyrite has been oxidized into various sulfate ions (for example, sodium sulfate, hydrogen sulfate, and iron sulfate). The x-axis is mass-to-charge ratio (m/z), and the y-axis is relative intensity % (r. int (%)). The mass-to-charge ratio is the ratio of an ion's mass to its formal charge. Relative intensity is also known as relative abundance and quantifies the amount of an ion produced in relation to the most abundant ion (the base peak).

Other Implementations

It is to be understood that while the implementations have been described in conjunction with the detailed description thereof, the foregoing description is intended to illustrate and not limit the scope of this disclosure, which is defined by the scope of the appended claims. Other aspects, advantages, and modifications are within the scope of the following claims.

What is claimed is:

1. A method of altering a wettability of a subterranean formation penetrated by a well, the method comprising:
    introducing a first oxidizer comprising a persulfate to the subterranean formation;
    introducing a second oxidizer comprising a bromate to the subterranean formation;
    shutting in the well for a period of time to allow the first oxidizer and the second oxidizer to alter the wettability of the subterranean formation toward non-wetting of oil and of water; and
    determining that the wettability of the subterranean formation has been altered toward non-wetting of oil and of water by performing a contact angle test on a rock sample obtained from the subterranean formation, wherein the contact angle test comprises:
        measuring a first contact angle of a first fluid comprising water on a surface of the rock sample; and
        measuring a second contact angle of a second fluid comprising a hydrocarbon on the surface of the rock sample, wherein determining that the wettability of the subterranean formation has been altered toward non-wetting of oil and of water comprises determining that the first contact angle and the second contact angle are both in a range from about 70° to about 110°.

2. The method of claim 1, comprising mixing the first oxidizer and the second oxidizer before introduction to the subterranean formation.

3. The method of claim 1, comprising introducing a spacer fluid to the subterranean formation after introducing the first oxidizer and before introducing the second oxidizer.

4. The method of claim 1, comprising introducing a spacer fluid to the subterranean formation after introducing the second oxidizer and before introducing the first oxidizer.

5. The method of claim 1, comprising:
    encapsulating the first oxidizer in a polymer shell or an oil phase; and
    encapsulating the second oxidizer in a polymer shell or an oil phase.

6. The method of claim 1, comprising suspending the first oxidizer and the second oxidizer in an emulsion, and introducing the first oxidizer and the second oxidizer to the subterranean formation comprises introducing the emulsion to the subterranean formation.

7. The method of claim 6, wherein a continuous phase of the emulsion comprises diesel, solvent, crude oil, or mineral oil.

8. The method of claim 1, comprising fracturing the subterranean formation.

9. The method of claim 1, comprising introducing a proppant to the subterranean formation.

10. The method of claim 9, wherein the proppant is introduced to the subterranean formation with at least one of the first oxidizer or the second oxidizer.

11. The method of claim 10, wherein a concentration of the proppant is at most about 10 pounds per gallon.

12. The method of claim 1, wherein the well is shut in for at least about 30 minutes.

13. The method of claim 1, wherein the first oxidizer is an aqueous solution of the first oxidizer, and a concentration of the persulfate in the aqueous solution of the first oxidizer is at least about 0.04 M.

14. The method of claim 1, wherein the second oxidizer is an aqueous solution of the second oxidizer, and a concentration of the bromate in the aqueous solution of the second oxidizer is at least about 0.01 M.

15. The method of claim 14, comprising introducing a chloride salt to the subterranean formation.

16. The method of claim 15, wherein the chloride salt is introduced as an aqueous solution of the chloride salt to the subterranean formation with at least one of the first oxidizer or the second oxidizer, and a concentration of the chloride salt is at least 0.25 M.

\* \* \* \* \*